United States Patent
Pregnolato et al.

(10) Patent No.: US 9,016,154 B2
(45) Date of Patent: Apr. 28, 2015

(54) GEAR CHANGE DEVICE FOR A MOTOR VEHICLE

(75) Inventors: Gianluigi Pregnolato, Orbassano (IT); Gianni Piacenza, Orbassano (IT); Andrea Piazza, Orbassano (IT)

(73) Assignee: C.R.F. Società Consortile per Azioni, Orbassano (Torino) (IT)

( * ) Notice: Subject to any disclaimer, the term of this patent is extended or adjusted under 35 U.S.C. 154(b) by 96 days.

(21) Appl. No.: 13/306,628

(22) Filed: Nov. 29, 2011

(65) Prior Publication Data
US 2013/0019705 A1 Jan. 24, 2013

(30) Foreign Application Priority Data
Jul. 20, 2011 (EP) .................................. 11174638

(51) Int. Cl.
| | | |
|---|---|---|
| *F16H 3/08* | (2006.01) | |
| *F16H 63/18* | (2006.01) | |
| *F16H 61/688* | (2006.01) | |
| *F16H 3/00* | (2006.01) | |

(Continued)

(52) U.S. Cl.
CPC .............. *F16H 63/18* (2013.01); *F16H 61/688* (2013.01); *F16H 3/006* (2013.01); *F16H 3/093* (2013.01); *F16H 2003/0931* (2013.01); *F16H 2200/0056* (2013.01); *F16H 2063/025* (2013.01)

(58) Field of Classification Search
CPC .............. F16H 57/0468; F16H 59/041; F16H 2063/321; F16H 2063/322; F16H 2200/0056; F16H 2063/025; F16H 3/093
USPC ........................................................ 74/331
See application file for complete search history.

(56) References Cited

U.S. PATENT DOCUMENTS

| | | | | |
|---|---|---|---|---|
| 3,478,615 A | * | 11/1969 | Hanchett ......................... | 74/339 |
| 4,576,063 A | * | 3/1986 | Akashi et al. ................... | 74/745 |
| 6,095,001 A | * | 8/2000 | Ruehle et al. ................... | 74/331 |

(Continued)

FOREIGN PATENT DOCUMENTS

| | | |
|---|---|---|
| DE | 102007030216 A1 | 1/2009 |
| EP | 1286088 A1 | 2/2003 |

OTHER PUBLICATIONS

Oct. 31, 2011 European Search Report in Application No. 11174638.4.

*Primary Examiner* — William Kelleher
*Assistant Examiner* — Zakaria Elahmadi
(74) *Attorney, Agent, or Firm* — Heslin Rothenberg Farley & Mesiti P.C.; Victor A. Cardona, Esq.

(57) ABSTRACT

A gear change device for including a first and a second primary shaft, selectively connectable to a driving shaft of a motor vehicle by a double clutch engagement device, and a first and a second secondary shaft. A plurality of gear selector devices rotatably couples each of the freely rotatable gear wheels with the shaft on which it is mounted, and, at least one rotatable actuator drum, for controlling the selector devices, having a plurality of cam tracks. The selector devices include respective fork-like actuator members and each has a cam follower element engaged in a respective cam track of the respective actuator drum. Each pair of cam tracks adjacent to each other provided on an actuator drum controls fork-like actuator members which are associated to different secondary shafts and which have the can follower elements thereof engaged on the drum in positions angularly spaced with respect to each other.

20 Claims, 7 Drawing Sheets

(51) Int. Cl.
*F16H 3/093* (2006.01)
*F16H 63/02* (2006.01)

(56) References Cited

U.S. PATENT DOCUMENTS

| | | | | |
|---|---|---|---|---|
| 6,189,397 B1* | 2/2001 | Morrow et al. | | 74/410 |
| 6,220,109 B1* | 4/2001 | Fischer et al. | | 74/337.5 |
| 6,634,247 B2* | 10/2003 | Pels et al. | | 74/329 |
| 7,311,015 B2* | 12/2007 | Kluge | | 74/337.5 |
| 7,428,852 B2* | 9/2008 | Baldwin et al. | | 74/337.5 |
| 7,467,564 B2* | 12/2008 | Baldwin et al. | | 74/337.5 |
| 7,487,691 B2* | 2/2009 | Kapp et al. | | 74/337.5 |
| 7,762,154 B2* | 7/2010 | Murakami et al. | | 74/331 |
| 7,866,227 B2* | 1/2011 | Mizuno et al. | | 74/331 |
| 7,895,910 B2* | 3/2011 | Caenazzo et al. | | 74/331 |
| 8,037,780 B2* | 10/2011 | Caenazzo et al. | | 74/473.37 |
| 8,082,816 B2* | 12/2011 | Lai et al. | | 74/337.5 |
| 8,091,447 B2* | 1/2012 | Garabello et al. | | 74/473.36 |
| 8,127,635 B2* | 3/2012 | Tsukada et al. | | 74/331 |
| 8,172,715 B2* | 5/2012 | Baldwin | | 475/302 |
| 8,276,473 B2* | 10/2012 | Kobayashi et al. | | 74/337.5 |
| 8,381,606 B2* | 2/2013 | Furquim et al. | | 74/331 |
| 2003/0154810 A1* | 8/2003 | Hedman | | 74/331 |
| 2003/0154811 A1* | 8/2003 | Hattori et al. | | 74/331 |
| 2007/0144292 A1* | 6/2007 | Koyama et al. | | 74/473.16 |
| 2009/0165582 A1* | 7/2009 | Tsunashima et al. | | 74/331 |
| 2011/0048150 A1* | 3/2011 | Dreibholz et al. | | 74/331 |
| 2011/0100144 A1* | 5/2011 | Neelakantan et al. | | 74/473.36 |
| 2011/0296934 A1* | 12/2011 | Piacenza et al. | | 74/55 |

* cited by examiner

GEAR CHANGE DEVICE FOR A MOTOR VEHICLE

CROSS REFERENCE TO RELATED APPLICATIONS

This application claims priority to European Patent Application No. 11174638.4 filed Jul. 20, 2011, the entire disclosure of which is incorporated herein by reference.

FIELD OF THE INVENTION

The present invention refers to gear change devices for motor vehicles, of the type comprising:
- a first and a second primary shaft coaxial with respect to each other, selectively connectable to the driving shaft of the motor vehicle by means of a double clutch engagement device,
- a first and a second secondary shaft, whose axes are parallel and spaced from the common axis of said primary shafts, and having respective output pinions (u', u") intended to mesh with a gear wheel of a differential,
- a plurality of pairs of gear wheels, corresponding to a plurality of forward gear ratios and to at least one reverse gear ratio, wherein the gear wheels of each pair are one rigidly connected in rotation with one of the primary shafts or with one of the secondary shafts while the other is freely rotatable on one of the secondary shafts or on one of the primary shafts, respectively
- a plurality of gear selector devices for rotatably coupling each of said freely rotatable gear wheels with the shaft on which it is mounted,
wherein the reverse gear ratio is defined by:
- a first reverse gear wheel mounted freely rotatable on the first secondary shaft and connectable in rotation with the latter by means of one of said selector devices, with the aim of selecting the reverse gear,
said device comprising at least one rotatable actuator drum, for controlling said selector devices, having a plurality of cam tracks,
wherein said selector devices include respective fork-like actuator members slidably mounted in a direction parallel to the axes of said primary and secondary shafts and each having a cam follower element engaged in a respective cam track of said at least one actuator drum, A gear change device of the above indicated type is described in U.S. Pat. No. 7,487,691 B2.

OBJECT AND SUMMARY OF THE INVENTION

The object of the present invention is that of providing a gear change device of the above indicated type which is simple and functional from a construction point of view and having a small overall dimension.

With the aim of attaining such objects, the invention aims at providing a gear change device having all the above indicated characteristics and also characterized in that each pair of cam tracks adjacent to each other provided on said at least one actuator drum controls fork-like actuator members which are associated to different secondary shafts and which have the cam follower elements thereof engaged on said at least one drum in positions angularly spaced with respect to each other.

Due to such characteristic, the cam tracks can be provided very close to each other, with an ensuing reduced axial dimension of the actuator drum, without leading to interference between the actuator members that engage different cam tracks.

Preferably, at least two cam tracks adjacent to each other of said at least one actuator drum occupy drum sections axially superimposed with respect to each other, so that the overall space axially occupied by the two tracks is smaller than the sum of the single axial overall dimensions of said tracks. Thus, the axial dimension of the drum can be reduced further.

In the preferred embodiment, each of said actuator members has an extended body with a fork-shaped end and the opposite end carrying the respective cam follower element, said body of each fork-like actuator member being slidably mounted on a pair of guide rods spaced from each other and parallel to the axes of said primary and secondary shafts.

Due to such characteristic, the stresses transmitted by the drum to each actuator member during the rotation of the drum, which are due to the engagement of the cam follower element in the cam track of the drum, are discharged on the two guide rods, without the risk of deformations of the fork-like actuator member and ensuing malfunctioning in the step of engaging and disengaging the gears.

Preferably, there are provided two pairs of cam tracks and two pairs of fork-like actuator members respectively associated to the two secondary shafts, the two actuator members associated to the same secondary shaft being slidably mounted on the same pair of guide rods.

Still in the preferred embodiment, there are provided two drums coaxially mounted one on the extension of the other and carrying two respective pairs of cam tracks, axially distributed along the two drums. The device is however conceived to be made in a simpler configuration, with a single drum carrying two pairs of cam tracks axially distributed along the drum. In the preferred embodiment, the cam tracks of each pair, which are associated to different secondary shafts, control either all even or all odd forward gears. With such arrangement, the use of two drums allows greater versatility in use, allowing obtaining multiple gear shifts without traction interruption.

BRIEF DESCRIPTION OF THE DRAWINGS

Further characteristics and advantages of the invention shall be clear from the description that follows with reference to the attached drawings, purely provided by way of example, wherein.

DETAILED DESCRIPTION OF THE INVENTION

Figure 1:
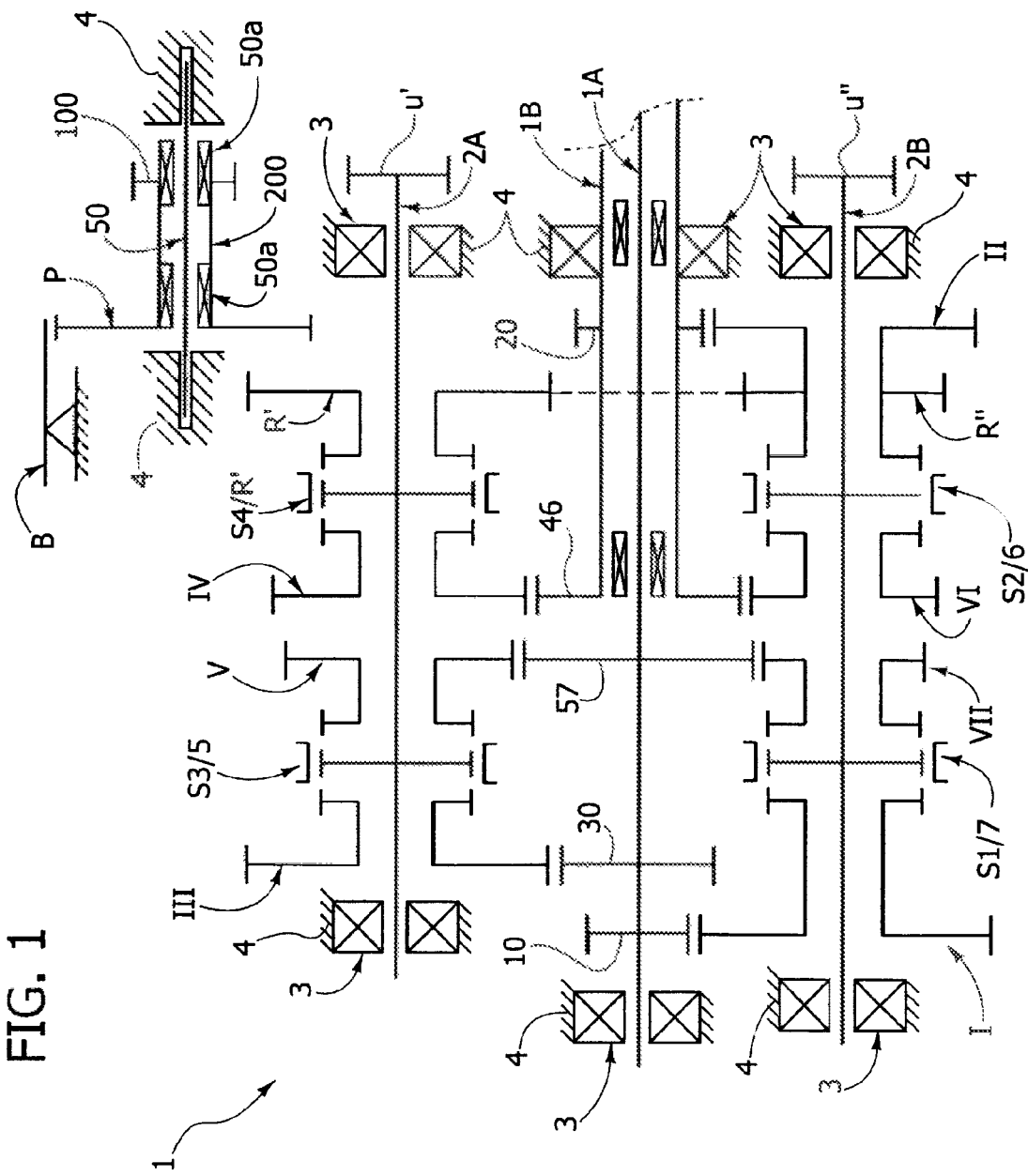
FIG. 1 is a diagram of a preferred embodiment of a gear change device to which the invention is applied.

FIG. 1 is a diagram of a gear change device previously illustrated in the patent application EP 11172411.8 of the applicant (still not open to public inspection as of date of priority of the present application) to which the disclosures of the present invention are preferably applied.

The gear change device illustrated in FIG. 1 comprises a first primary shaft 1A and a second primary shaft 1B coaxial with respect to each other, whose right ends (with reference to the figure) can be selectively connected to the driving shaft of a motor vehicle by means of a double clutch engagement device of any known type (not illustrated).

A first and a second secondary shaft, whose axes are parallel and spaced from the common axis of the two primary shafts 1A, 1B are indicated in their entirety with references 2A, 2B.

Figure 5:
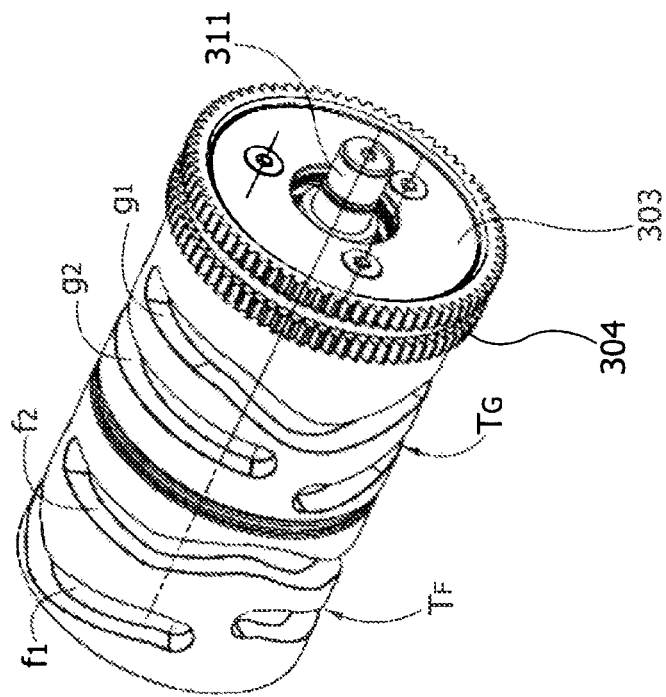
FIG. 5 is a cross-sectional view of the parts visible in FIGS. 3, 4, FIGS. 6-8 are a perspective view, a lateral view and a sectional view of the unit comprising the two actuator drums provided in the preferred embodiment.

For better clarity, the figures show the shafts 1A, 1B, 2A, 2B as if the three axes thereof were arranged in the same plane, while such axes actually are not coplanar, but they are arranged to form a triangle (also see FIG. 5).

All the abovementioned shafts are rotatably supported by means of roller bearings 3 within the casing 4 of the gearbox.

The two secondary shafts 2A, 2B have—at the right ends thereof (with reference to the figures)—output pinions u', u" (which may have an equivalent or different number of teeth) intended to mesh both, in a per se known manner, with a gear wheel of a differential (not illustrated).

The illustrated gear change device has a plurality of pairs of gear wheels, corresponding to the plurality of forward gear ratios and to a reverse gear ratio, in which the gear wheels of each pair are one rigidly connected in rotation with one of the primary shafts or with one of the secondary shafts, while the other is freely rotatable respectively, in the two cases, on one of the secondary shafts or on one of the primary shafts. Furthermore, still according to the conventional art, the device comprises a plurality of gear selector devices adapted to couple—in rotation—each of said freely rotatable gear wheels with the shaft on which it is mounted.

In the specific illustrated case, references I, II, III, IV, V, VI, VII, R" respectively indicate gear wheels freely rotatably mounted on the first or on the second secondary shaft 2A, 2B and couplable with the respective secondary shaft for respectively selecting the first, second, third, fourth, fifth, sixth, seventh gears and the reverse gear.

The gear wheel I meshes with a gear wheel 10 rigidly and permanently connected in rotation with the first primary shaft 1A, i.e. on the inner primary shaft, on an end portion thereof which extends beyond the end of the second primary shaft 1B.

The gear wheel II of the second gear meshes with a gear wheel 20 rigidly connected on the primary shaft 1B.

The gear wheel III of the third gear meshes with a gear wheel 30 rigidly connected on the primary shaft 1A.

The gear wheel IV of the fourth gear and the gear wheel VI of the sixth gear both mesh with the same gear wheel 46 rigidly connected on the primary shaft 1B.

The gear wheel V of the fifth gear and the gear wheel VII of the seventh gear both mesh with the same gear wheel 57 rigidly connected on the primary shaft 1A.

The selector devices for rotatably coupling each of the gear wheels I, II, III, IV, V, VI, VII, R" are indicated with references S1/7, S2/6, S3/5, S4/R, each of such selectors being actuatable in opposite directions for selecting different gears (the digits of the number that follows the reference S indicate the gears thus selectable)

The second forward gear is defined by a pair of gear wheels 20,II, the first permanently connected in rotation with the outermost primary shaft 1B and the other mounted freely rotatable on the second secondary shaft 2B and which can be coupled in rotation therewith through an engagement device schematically illustrated in the drawing and indicated with reference S2/6 (for indicating that such device selects the second gear in one direction and the sixth gear in the other direction).

The reverse gear ratio is defined by a first reverse gear wheel R' which is mounted freely rotatable on the first secondary shaft 2A and it is rotatably couplable therewith through the selector device S4/R and by a second reverse gear wheel R", which serves as an idle gear wheel for inverting the motion and which meshes with the first gear wheel R (such meshing is schematised in the figures with the dashed line, also being made possible by the fact that the two axes of the secondary shafts and the common axis of the primary shafts are not contained in the same plane). The second reverse gear wheel R" is permanently connected in rotation with the gear wheel II of the second gear wheel and it is mounted freely rotatable therewith above the second secondary shaft 2B.

With the arrangement described above, the engagement of the reverse gear is obtained by activating the selector device S4/R and leaving the selector device S2/6 disabled, so as to leave the reverse gear wheel R" freely rotatable on the second secondary shaft 2B. In such situation, the motion coming from the outermost primary shaft 1B is transferred to the gear wheel II and therefrom to the gear wheel R", to the gear wheel R' and to the first secondary shaft 2A.

In the illustrated example, the gear change device of the invention further comprises a fifth shaft 50 parallel and spaced with respect to the common axis of the two primary shafts 1A, 1B and with respect to the axes of the two secondary shafts 2A, 2B and carrying a further pinion 100 for meshing with the gear wheel of the differential. The pinion 100 is arranged in the same plane in which there are arranged the pinions u', u" associated to the two secondary shafts 2A, 2B, also intended to mesh with the gear wheel of the differential. For an easier illustration the shaft 50 is illustrated as if it were on the same plane as the shafts 1A, 1B, 2A, 2B, while actually this is not the case, given that the two pinions u', u" and the pinion 100 all mesh with the same gear wheel of the differential. The fifth shaft 50 also carries a parking gear wheel P connected in rotation with the pinion 100 and cooperating with a locking device B supported by the fixed structure of the gear change device, for locking the differential in a parking condition. The construction details of the locking device B are neither described nor illustrated, given that such device can be any of the known type and it does not fall, independently, within the scope of the invention. Furthermore, the elimination of such details from the drawings makes the latter quicker and easier to understand. In the illustrated example, the fifth shaft 50 is arranged within the casing structure 4 of the gear change device, with the ends thereof rigidly anchored to such structure. In the case of such solution, the pinion 100 and the parking gear wheel P are rigidly connected to each other by a shaft 200 mounted freely rotatable on the fifth shaft 50 by means of supports 50a, for example roller bearings or friction bushings. Hence, both the pinion 100 and the parking gear wheel 50 are freely rotatable within the casing of the device around the axes of the fifth shaft 50. It should be observed that the parking gear wheel P is freely rotatable around the axis if the fifth shaft 50, entirely independent with respect to the primary shafts 1A, 1B and with respect to the secondary shafts 2A, 2B, i.e. without any transmission of connection with any of said primary shafts and said secondary shafts. When the locking device B is actuated, the gear wheel P is locked against the rotation, hence the pinion 100 connected thereto locks the gear wheel of the differential meshing therewith.

Furthermore, still in the case of the illustrated example, the parking gear wheel P radially extends in the space between the first reverse gear wheel R' and the roller bearing 3 which supports the first secondary shaft 2A and which is axially interposed between the first reverse gear wheel and the pinion u'. This indicates that the parking gear wheel P has an intermediate axial position between the gear wheel R' and the mentioned bearing 3 and that the gear wheels R' and P, in front view, intersect with respect to each other. Due to such characteristic, the space available within the box of the gear change device is best exploited for providing a parking gear wheel P with relatively large diameter, implying that the force that the locking device B is required to bear is relatively low.

Figure 2:
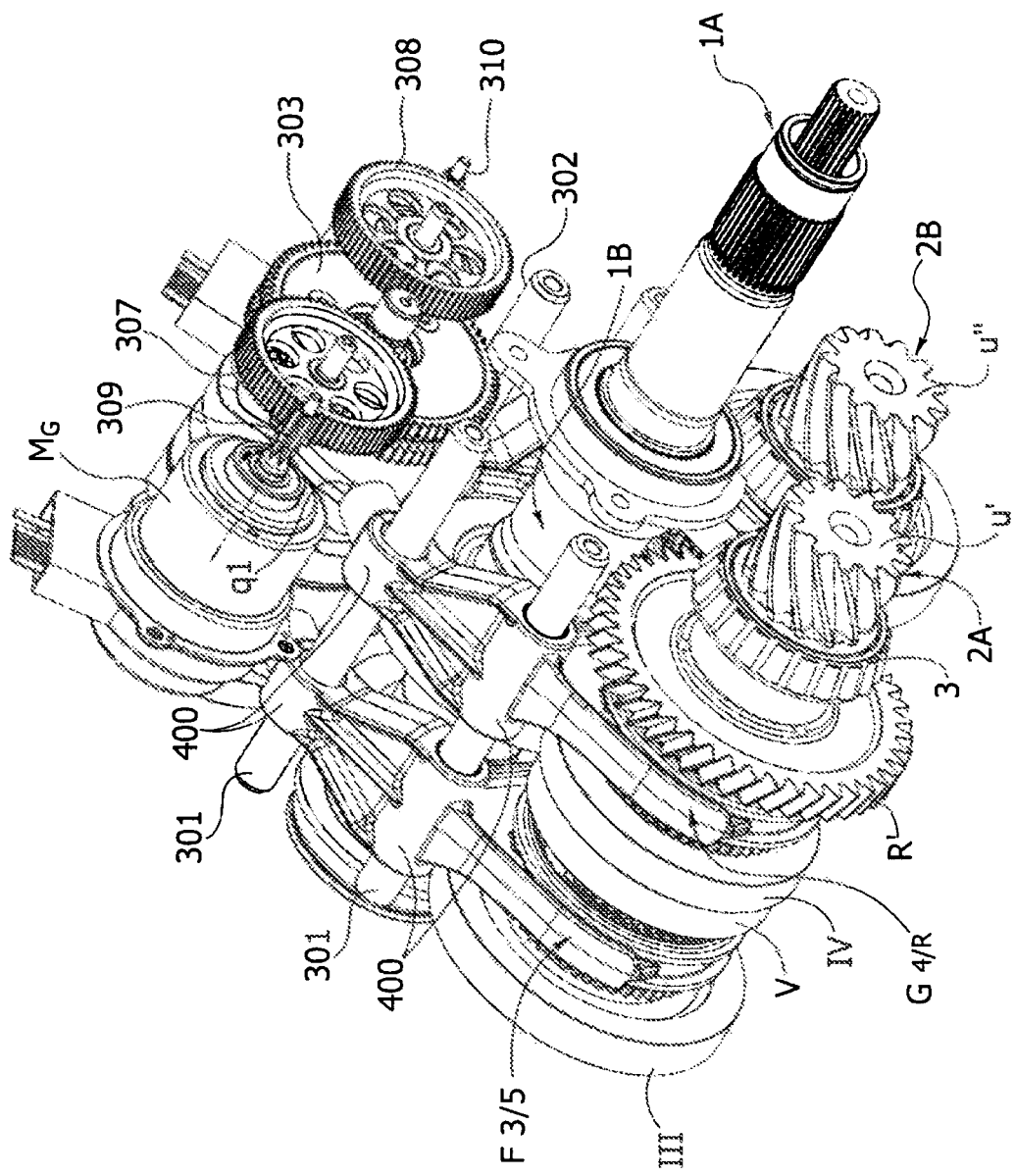
FIG. 2 is a perspective view of the main components of a gear change device according to a preferred embodiment of the invention.

FIGS. 2-8 illustrate the main components of a preferred embodiment of the gear change device according to the invention, corresponding to the diagram of FIG. 1. Such figures do not show the fifth shaft 50. FIG. 2 partially shows the two primary shafts 1A, 1B and the two secondary shafts 2A, 2B, as well as some of the gear wheels associated thereto (the references in FIG. 2 are the same shown in FIG. 1).

Figure 3:
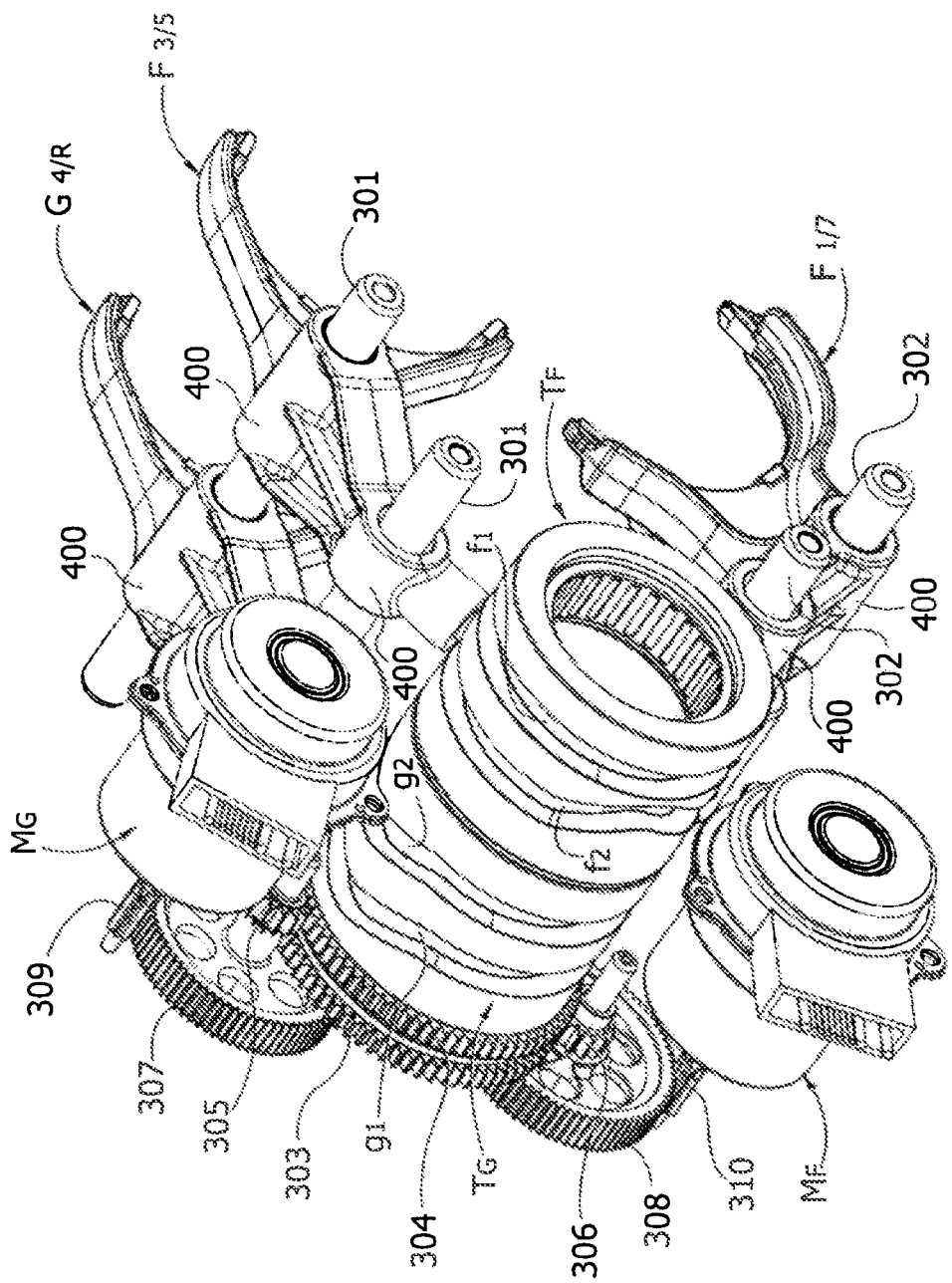
FIGS. 3, 4 are perspective views of the two actuator drums provided in the preferred embodiment, together with the related control motors and to the fork-like actuator members actuated thereby.
Figure 4:
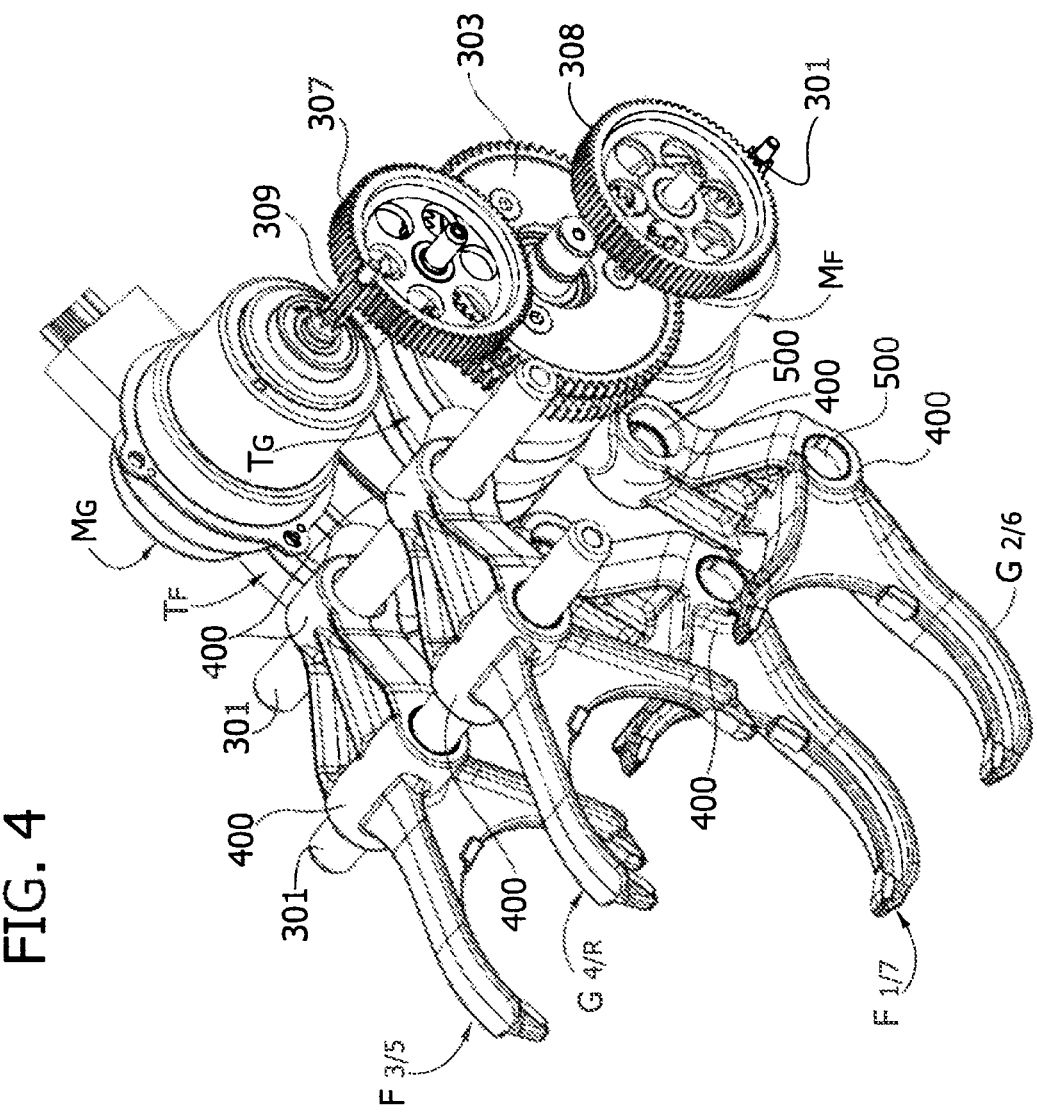

Also with reference to FIGS. 3-5, the gear selector devices S4/R', S3/5, S2/6 and S1/7 which are visible in 1 are made up of sleeves which can be displaced axially by means of fork-like actuator members, indicated in the drawings with the symbols F and G followed by the references of the gears controlled thereby. The symbol F is used for the fork-like actuator members intended to be controlled by a first actuator drum $T_F$ and the symbol G is used for the fork-like actuator members intended to be controlled by a second actuator drum $T_G$, as better illustrated hereinafter.

As clearly visible in FIGS. 3, 4, the two fork-like members F3/5 and G4/R are both slidably mounted on two guide rods 301 parallel and spaced with respect to each other, and connected to the fixed structure 4 of the gear change device (not shown in such figures). The rods 301 are directly parallel to the axes of the primary and secondary shafts. Analogously, the two fork-like elements F1/7 and G2/6 are both slidably mounted on two guide rods 302 spaced from each other and parallel to the axes of the shafts of the gear change device.

Each of the fork-like members F and G has an extended body, with a fork-like end which engages the sleeve of the respective selector device and the opposite end terminating with a cam follower element, in form of a pin, which engages a respective cam track of a respective rotary actuator drum. As observable in FIG. 4, the body of each fork-like actuator member comprises an intermediate portion with an enlarged section, defining two hubs 400 with holes 500 for engaging the respective guide rods, by interposing respective support bushings (not illustrated).

In the preferred embodiment which is illustrated in the attached drawings, there are provided two actuator drums $T_F$ and $T_G$ coaxially arranged one on the extension of the other and having respective pairs of cam tracks $f_1$, $f_2$ and $g_1$, $g_2$.

Figure 9:
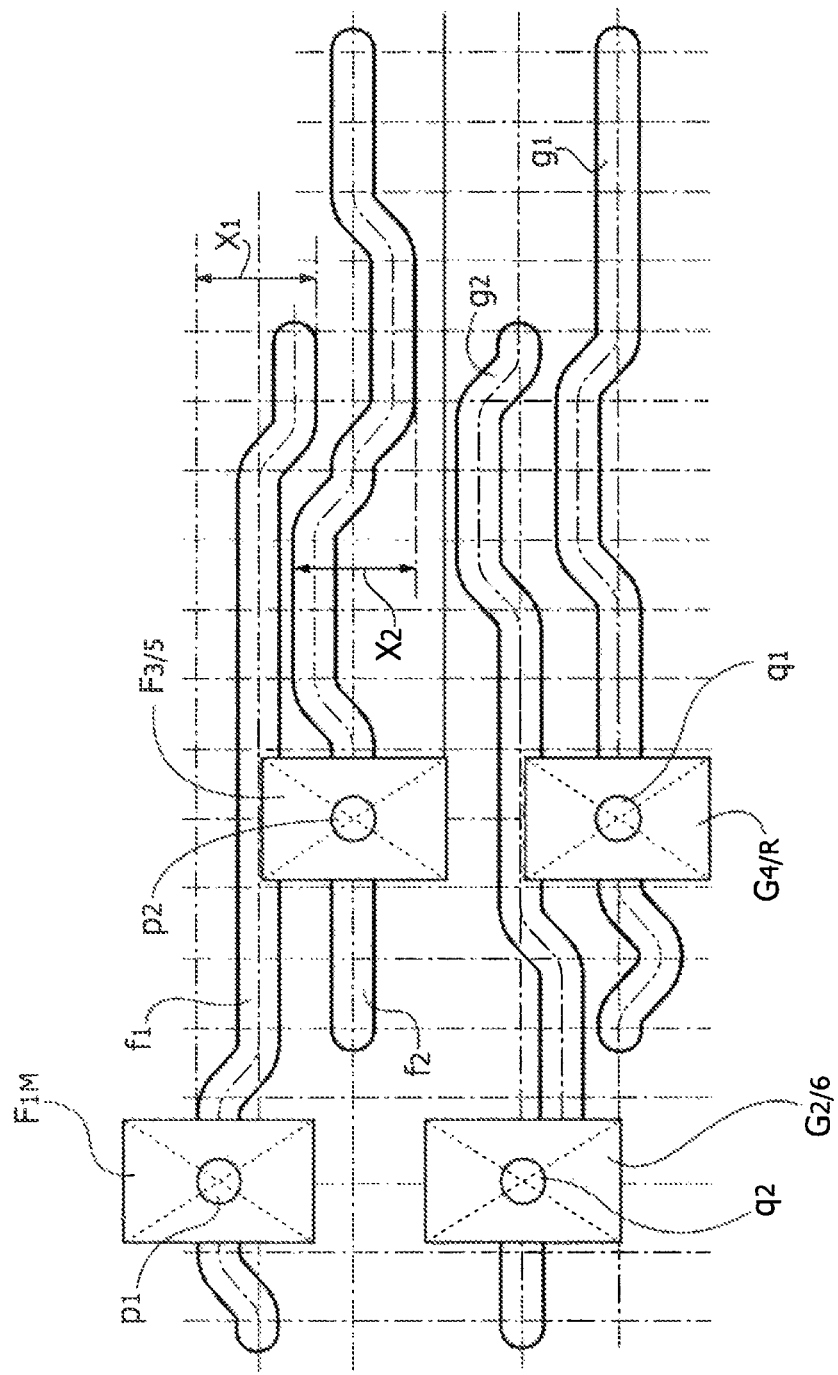
FIG. 9 illustrates the development in the plane of four cam tracks of the two actuator drums of FIGS. 6-8, with a schematic representation of four actuator members with the respective cam follower pins.

FIG. 9 of the attached drawings shows the development in the plane of the four cam tracks $f_1$, $f_2$, $g_1$, $g_2$, with a schematic representation of the four actuator members F1/7, F3/5, G4/7, G2/6, with the respective cam follower pins $p_1$, $p_2$, $q_1$, $q_2$.

As instantly observable from FIGS. 3, 4 and 9, the two cam tracks $f_1$, $f_2$ of the first actuator drum $T_F$ control fork-like actuator members $F_{1/7}$ and $F_{3/5}$ which are associated to different secondary shafts and which control all odd gears. At the same time, the two cam tracks $g_1$, $g_2$ of the other actuator drum $T_G$ control the two fork-like actuator members G4/R' and G2/6 which are also associated to different secondary shafts and which control all even gears, as well as, in the case of the illustrated example, the reverse gear.

Figure 8:
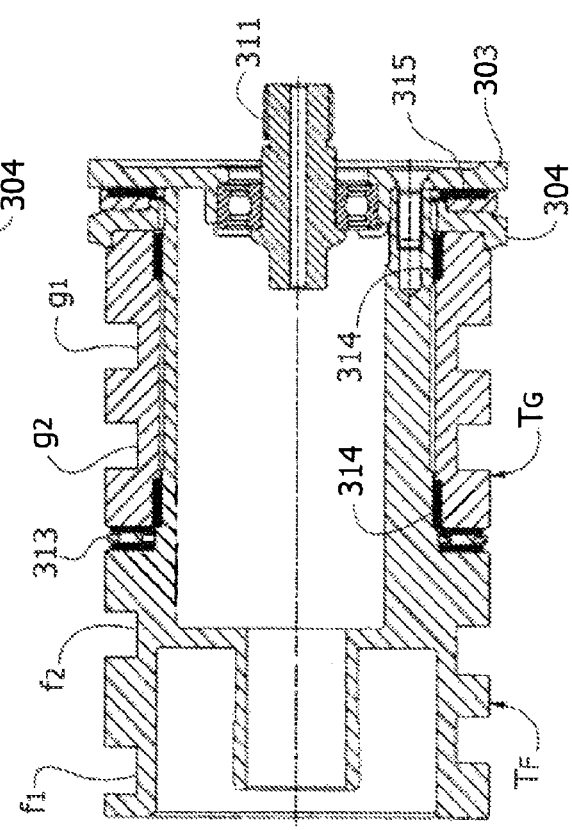

The two actuator drums $T_F$ and $T_G$ are rotatably mounted one with respect to the other, as better illustrated in FIG. 8. The drum $T_F$ has a portion which rotatably supports the drum $T_G$ by means of friction bearings 314, a fifth wheel 315 and a thrust bearing 313. The body of the drum $T_F$ is further rigidly connected at the right end thereof (with reference to FIG. 8) to a toothed gear wheel 303, while the actuator drum $T_G$ is connected in rotation with a toothed gear wheel 304. The unit of the two drums $T_F$, $T_G$ is further rotatably supported, by means of the gear wheel 303, on a support pin 311, through a friction bearing 312.

The two gear wheels 303, 304 connected in rotation with the actuator drums $T_F$, $T_G$ are controlled in rotation by two electrical motors $M_F$, $M_G$ (see FIGS. 3-5), by means of pinions 310, 309 respectively carried by the shafts of said electrical motors and meshing with gear wheels 308, 307, respectively. The gear wheels 307, 308 are joined integral in rotation with pinions 305, 306 which mesh with the aforementioned gear wheels 304, 303 associated to the two actuator drums. Obviously, the structure of the motors $M_F$, $M_G$, and the shafts for supporting the unit of the actuator drums and of the aforementioned gear wheels for the transmission of the rotation to the actuator drums are all connected to the structure 4 of the gear change device (not shown in the drawings). In the illustrated example the two motors $M_F$, $M_G$ are located on the diametrically opposite sides of the unit of the actuator drums $T_F$, $T_G$, respectively beneath and above with respect thereto.

As clear from the description above, in the gear change device according to the invention each pair of cam tracks $f_1$, $f_2$ and $g_1$, $g_2$, provided on each actuator drum $T_F$ and $T_G$, controls fork-like actuator members F and G which are associated to different secondary shafts and which have the cam follower elements thereof (see in particular FIG. 5) engaged on the actuator drums in positions angularly spaced with respect to each other (see angle α in FIG. 5).

Due to the aforementioned arrangement, the cam tracks $f_1$, $f_2$ and $g_1$, $g_2$ of each pair (see FIG. 9) can be axially very close to each other, without the risk of the related fork-like actuator members (F and G respectively) interfering with respect to each other.

In particular, due to the aforementioned arrangement, the cam tracks $f_1$, $f_2$, and $g_1$, $g_2$ of each pair can thus be approached axially to occupy drum sections axially superimposed with respect to each other, as observable in FIG. 9. With reference to such figures the overall axial dimension of the drum sections respectively occupied by the cam tracks $f_1$, $f_2$ was indicated with X1 and X2. As observable, the two sections X1, X2 are partly overlapped with respect to each other, so that the overall space axially occupied by the two tracks is smaller than the sum of the single axial overall dimensions of said tracks. Same case applies to the tracks $g_1$, and $g_2$. Thus, such arrangement allows considerably reducing the axial overall dimension of the actuator drums and hence the overall dimensions of the gear box.

The previously described mounting of the fork-like actuator members F, G, which provides for that such members be mounted in pairs on two guide rods parallel and spaced with respect to each other (301, 302) has the further advantage lying in the fact that the stresses transmitted by the respective cam track to the cam follower element can be discharged on the two guide rods, without the risk of unwanted deformations of the fork-like actuator member or faulty engagement or disengagement of the gears. Actually, it should be observed that when an actuator drum is actuated, the engagement of the cam track on the respective cam follower element causes the application of a force on such cam follower element which has both a component parallel to the axis of the drum (which determines the axial sliding of the fork-like element) and a tangential component, which is thus discharged on the two guide rods without unduly stressing la structure of the fork-like element.

Still with reference to FIG. 5, it is instantly observable that the previously described arrangement, with the two cam tracks of each drum which controls fork-like actuator members associated to different secondary shafts, is allowed by the architecture of the gear change device according to the invention. Such architecture provides for that the two secondary shafts 2A, 2B be on one side with respect to the primary shafts 1A, 1B and that on the diametrically opposite side there be located the two actuator drums $T_F$, $T_G$. The fork-like actuator members F and G controlled by the two actuator drums have extended bodies and shaped with a curvature which surrounds, from one side to the other, the two primary shafts 1A, 1B, to reach the two secondary shafts 2A, 2B. The slidable support by means of a double rod 301, 302 is particularly advantageous with the aim of attaining the aforementioned extended configuration of the body of the fork-like actuator members.

Figure 6:
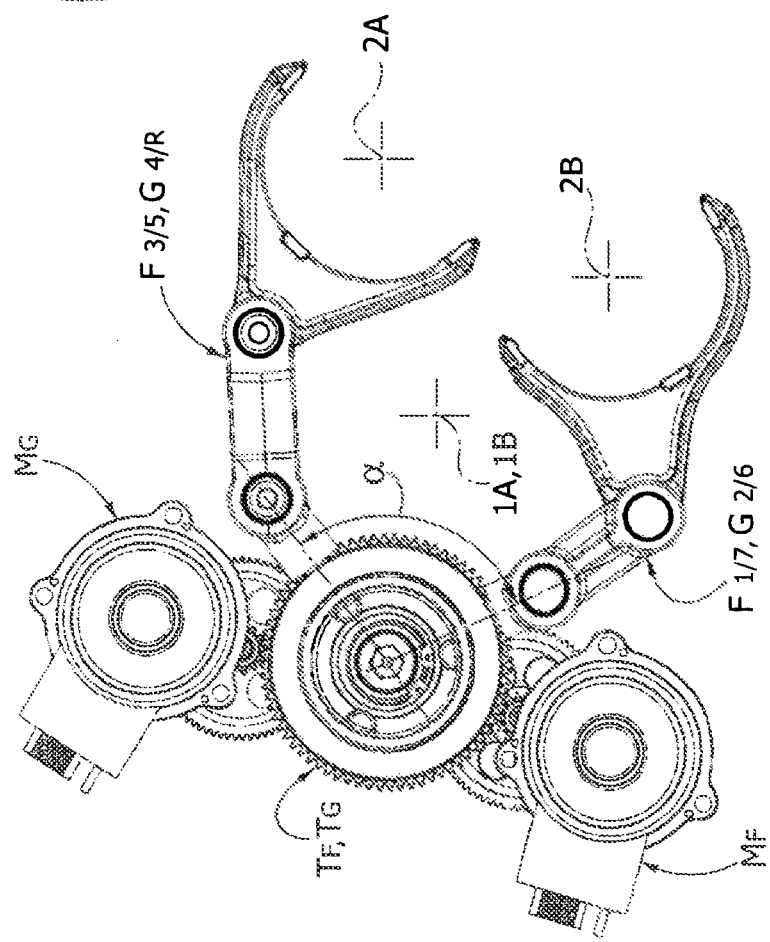
Figure 7:
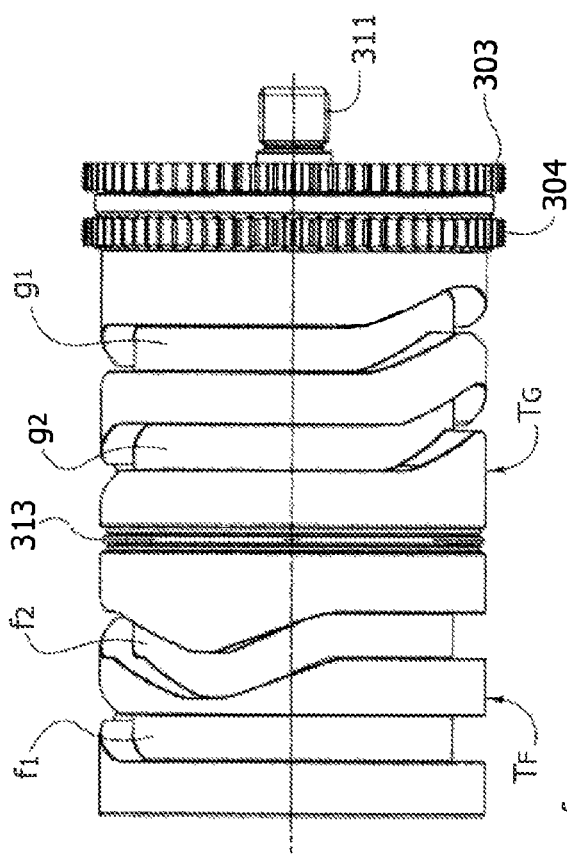

Still particularly with reference to FIGS. 6 and 9, the cam tracks provided in the preferred embodiment described herein do not extend by 360° and thus each have opposite terminal ends.

A further advantage of the previously described arrangement lies in the fact that it is suitable to be transformed through simple operations and without requiring considerable modifications on the structure of the gear change device in a simplified solution which provides for a single actuator drum with two pairs of cam tracks axially distributed along the drum, in a manner entirely analogous to the description provided with reference to the two drums. In such case there is obviously provided for a single mesh transmission controlled by a single electrical motor. As a matter of fact, the arrangement of the fork-like actuator members may remain identical. Obviously, the preferred embodiment which provides for two separate actuator drums allows greater versatility of use, in that it allows providing multiple gear shifts without interrupting the traction on the vehicle, due to the use of the double clutch engagement, according to a per se well known art.

Obviously, without prejudice to the principle of the invention, the construction details and the embodiments may widely vary with respect to what has been described and illustrated purely by way of example, without departing from the scope of protection of the present invention.

In particular, though the embodiment illustrated by way of example provides for gear selector devices which respectively control the 1 and 7; 2 and 6; 3 and 5 as well as 4 and R pairs of gears, an entirely different coupling of the gears in association to each selector device can be provided for.

What is claimed is:

1. Gear change device for a motor vehicle, comprising:
a first primary shaft and a second primary shaft coaxial with respect to each other, selectively connectable a driving shaft of the motor vehicle by a double clutch engagement device,
a first secondary shaft and a second secondary shaft, whose axes are parallel and spaced from the common axis of said primary shafts, and having respective output pinions intended to mesh with a gear wheel of a differential,
a plurality of pairs of gear wheels, corresponding to a plurality of forward gear ratios and to at least one reverse gear ratio, wherein the gear wheels of each pair are one rigidly connected in rotation with one of the primary shafts or with one of the secondary shafts while the other is freely rotatable on one of the secondary shafts or on one of the primary shafts, respectively
a plurality of gear selector devices for rotatably coupling each of said freely rotatable gear wheels with the shaft on which it is mounted,
wherein the reverse gear ratio is defined by:
a first reverse gear wheel mounted freely rotatable on the first secondary shaft and connectable in rotation with the first secondary shaft by one of said selector devices, with the aim of selecting the reverse gear,
at least one rotatable actuator drum, for controlling said selector devices, having a plurality of cam tracks,
wherein said selector devices include respective fork-like actuator members slidably mounted in a direction parallel to the axes of said primary and secondary shafts and each having a cam follower element engaged in a respective cam track of said at least one actuator drum, wherein each pair of cam tracks adjacent to each other provided on said at least one actuator drum controls fork-like actuator members, each of said cam tracks associated to different secondary shafts and have the cam follower elements thereof engaged on said at least one drum in positions angularly spaced with respect to each other; and
said cam tracks of said at least one actuator drum comprise a first track, a second track, a third track and a fourth track;
said first track extending in a first substantially circumferential direction, a first track portion of said first track extending axially toward said second track and away from a remainder of said first track, said first track having a first width with a first axial dimension;
said second track extending in a second substantially circumferential direction, a second track portion of second track extending axially toward said first track and away from a second remainder of said second track, said second track having a second width with a second axial dimension;
said first track portion extending axially onto a second circumference of said at least one actuator drum occupied by said second width and said second track portion extending axially onto a first circumference of said at least one actuator drum occupied by said first width such that said first track and said second track axially overlap to occupy a common circumference;
said first track and said second track independent from and avoiding intersecting with each other, and said third track and said fourth track independent from and avoiding intersecting with each other;
said first track engaged with a first cam follower element of the cam follower elements and said second track engaged with a second cam follower element of the cam follower elements, said first can follower element and said second cam follower element independent from each other; and
said third track engaged with a third cam follower element of the cam follower elements and said fourth track engaged with a fourth cam follower element of the cam follower elements, said third cam follower element and said fourth cam follower element independent from each other.

2. Gear change device according to claim 1, wherein each of said fork-like actuator members has an extended body with a fork-shaped end and the opposite end carrying the respective cam follower element, said body of each fork-like actuator member being slidably mounted on a pair of guide rods spaced from each other and parallel to the axes of said primary and secondary shafts.

3. Gear change device according to claim 2, wherein the axes of the two secondary shafts and the common axis of said primary shafts have a triangular arrangement, with said secondary shafts arranged on one side, with respect to said common axis, which is diametrically opposite to the side on which said at least one drum is arranged, said actuator members having the extended bodies thereof shaped with a curvature surrounding said primary shafts.

4. Gear change device according to claim 2, further comprising two pairs of cam tracks and two pairs of fork-like actuator members respectively associated to the two secondary shafts, the two actuator members associated to the same secondary shaft being slidably mounted on the same pair of guide rods.

5. Gear change device according to claim 4, further comprising a single drum carrying two pairs of cam tracks axially distributed along the drum.

6. Gear change device according to claim 4, further comprising two drums coaxially mounted one on the extension of the other and carrying two respective pairs of cam tracks, axially distributed along the two drums.

7. Gear change device according to claim 1, further comprising two pairs of cam tracks and that the cam tracks of each pair, which are associated to different secondary shafts, controls either all even or all odd forward gears.

8. Gear change device according to claim 3, further comprises two pairs of cam tracks and two pairs of fork-like actuator members respectively associated to the two secondary shafts, the two actuator members associated to the same secondary shaft being slidably mounted on the same pair of guide rods.

9. Gear change device for a motor vehicle, comprising:
a first primary shaft and a second primary shaft coaxial with respect to each other, selectively connectable a driving shaft of the motor vehicle by a double clutch engagement device,
a first secondary shaft and a second secondary shaft, whose axes are parallel and spaced from the common axis of said primary shafts, and having respective output pinions intended to mesh with a gear wheel of a differential,
a plurality of pairs of gear wheels, corresponding to a plurality of forward gear ratios and to at least one reverse gear ratio, wherein the gear wheels of each pair are one rigidly connected in rotation with one of the primary shafts or with one of the secondary shafts while the other is freely rotatable on one of the secondary shafts or on one of the primary shafts, respectively
a plurality of gear selector devices for rotatably coupling each of said freely rotatable gear wheels with the shaft on which it is mounted,
wherein the reverse gear ratio is defined by:
a first reverse gear wheel mounted freely rotatable on the first secondary shaft and connectable in rotation with the first secondary shaft by one of said selector devices, with the aim of selecting the reverse gear,
at least one rotatable actuator drum, for controlling said selector devices, having a plurality of cam tracks,
wherein said selector devices include respective fork-like actuator members slidably mounted in a direction parallel to the axes of said primary and secondary shafts and each having a cam follower element engaged in a respective cam track of said at least one actuator drum, wherein each pair of cam tracks adjacent to each other provided on said at least one actuator drum controls fork-like actuator members which are associated to different secondary shafts and which have the cam follower elements thereof engaged on said at least one drum in positions angularly spaced with respect to each other, and
two pairs of cam tracks, the cam tracks of each pair, which are associated to different secondary shafts, controls either all even or all odd forward gears;
the cam tracks of each pair independent from and avoiding intersecting with each other;
a first cam track of the cam tracks of each pair engaged with a first cam follower element of the cam follower elements and a second cam track of the cam tracks of each pair engaged with a second cam follower element of the cam follower elements, said first cam follower element and said second cam follower element independent from each other.

10. Gear change device according to claim 9, wherein at least two cam tracks adjacent to each other of said at least one actuator drum occupy drum sections axially superimposed with respect to each other, so that the overall space axially occupied by the two tracks is smaller than the sum of the single axial overall dimensions of said tracks.

11. Gear change device according to claim 9, wherein each of said fork-like actuator members has an extended body with a fork-shaped end and the opposite end carrying the respective cam follower element, said body of each fork-like actuator member being slidably mounted on a pair of guide rods spaced from each other and parallel to the axes of said primary and secondary shafts.

12. Gear change device according to claim 11, wherein the axes of the two secondary shafts and the common axis of said primary shafts have a triangular arrangement, with said secondary shafts arranged on one side, with respect to said common axis, which is diametrically opposite to the side on which said at least one drum is arranged, said actuator members having the extended bodies thereof shaped with a curvature surrounding said primary shafts.

13. Gear change device according to claim 11, further comprising two pairs of cam tracks and two pairs of fork-like actuator members respectively associated to the two secondary shafts, the two actuator members associated to the same secondary shaft being slidably mounted on the same pair of guide rods.

14. Gear change device according to claim 13, further comprising a single drum carrying two pairs of cam tracks axially distributed along the drum.

15. Gear change device according to claim 13, further comprising two drums coaxially mounted one on the extension of the other and carrying two respective pairs of cam tracks, axially distributed along the two drums.

16. Gear change device for a motor vehicle, comprising:
a first primary shaft and a second primary shaft coaxial with respect to each other, selectively connectable a driving shaft of the motor vehicle by a double clutch engagement device,
a first secondary shaft and a second secondary shaft, whose axes are parallel and spaced from the common axis of said primary shafts, and having respective output pinions intended to mesh with a gear wheel of a differential,
a plurality of pairs of gear wheels, corresponding to a plurality of forward gear ratios and to at least one reverse gear ratio, wherein the gear wheels of each pair are one rigidly connected in rotation with one of the primary shafts or with one of the secondary shafts while the other is freely rotatable on one of the secondary shafts or on one of the primary shafts, respectively a plurality of gear selector devices for rotatably coupling each of said freely rotatable gear wheels with the shaft on which it is mounted, wherein the reverse gear ratio is defined by:

a first reverse gear wheel mounted freely rotatable on the first secondary shaft and connectable in rotation with the first secondary shaft by one of said selector devices, with the aim of selecting the reverse gear, at least one rotatable actuator drum, for controlling said selector devices, having a plurality of cam tracks, wherein said selector devices include respective fork-like actuator members slidably mounted in a direction parallel to the axes of said primary and secondary shafts and each having a cam follower element engaged in a respective cam track of said at least one actuator drum, wherein each pair of cam tracks adjacent to each other provided on said at least one actuator drum controls fork-like actuator members which are associated to different secondary shafts and which have the cam follower elements thereof engaged on said at least one drum in positions angularly spaced with respect to each other, and wherein each of said fork-like actuator members has an extended body with a fork-shaped end and the opposite end carrying the respective cam follower element, and the axes of the two secondary shafts and the common axis of said primary shafts have a triangular arrangement, with said secondary shafts arranged on one side, with respect to said common axis, which is diametrically opposite to the side on which said at least one drum is arranged, said actuator members having the extended bodies thereof shaped with a curvature surrounding said primary shafts such that said primary shafts are located between interior arm portions of said body of each of said actuator members;

wherein said body of each fork-like actuator member being slidably mounted on a pair of guide rods spaced from each other and parallel to the axes of said primary and secondary shafts.

17. Gear change device according to claim 16, wherein at least two cam tracks adjacent to each other of said at least one actuator drum occupy drum sections axially superimposed with respect to each other, so that the overall space axially occupied by the two tracks is smaller than the sum of the single axial overall dimensions of said tracks.

18. Gear change device according to claim 17, further comprising two pairs of cam tracks and two pairs of fork-like actuator members respectively associated to the two secondary shafts, the two actuator members associated to the same secondary shaft being slidably mounted on the same pair of guide rods.

19. Gear change device according to claim 18, further comprising a single drum carrying two pairs of cam tracks axially distributed along the drum.

20. Gear change device according to claim 18, further comprising two drums coaxially mounted one on the extension of the other and carrying two respective pairs of cam tracks, axially distributed along the two drums.

* * * * *